United States Patent …

(12) United States Patent
Fujimoto et al.

(10) Patent No.: US 10,393,188 B2
(45) Date of Patent: Aug. 27, 2019

(54) VEHICLE TRANSMISSION STRUCTURE

(71) Applicant: HONDA MOTOR CO., LTD., Tokyo (JP)

(72) Inventors: Yasushi Fujimoto, Wako (JP); Taku Hirayama, Wako (JP); Hiroyuki Makita, Wako (JP); Takafumi Goto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 15/447,293

(22) Filed: Mar. 2, 2017

(65) Prior Publication Data

US 2017/0268576 A1 Sep. 21, 2017

(30) Foreign Application Priority Data

Mar. 18, 2016 (JP) .................... 2016-055936

(51) Int. Cl.
| | |
|---|---|
| *F16D 3/10* | (2006.01) |
| *F16D 7/04* | (2006.01) |
| *F16D 1/12* | (2006.01) |
| *F16F 15/10* | (2006.01) |
| *F16H 35/10* | (2006.01) |

(52) U.S. Cl.
CPC ............... *F16D 7/044* (2013.01); *F16D 1/12* (2013.01); *F16D 3/10* (2013.01); *F16F 15/10* (2013.01); *F16H 35/10* (2013.01); *B60Y 2200/12* (2013.01); *F16F 2230/0064* (2013.01)

(58) Field of Classification Search
CPC ... F16D 7/044; F16D 1/12; F16D 3/10; F16H 35/10; F16F 15/10; F16F 2230/0064; B60Y 2200/12

USPC ............................................. 464/38, 39, 161
See application file for complete search history.

(56) References Cited

U.S. PATENT DOCUMENTS

| | | | | |
|---|---|---|---|---|
| 1,897,322 A | * | 2/1933 | Montgomery .......... | E21B 17/06 |
| 2,333,553 A | * | 11/1943 | Potgieter ................. | F16D 7/044 |
| | | | | 464/38 |
| 7,682,255 B2 | * | 3/2010 | Monis ..................... | F16D 7/044 |
| | | | | 464/161 |
| 8,272,982 B2 | * | 9/2012 | Fitz ......................... | F16H 55/36 |
| | | | | 464/39 |
| 9,933,065 B2 | * | 4/2018 | Makita ..................... | F16H 3/08 |

FOREIGN PATENT DOCUMENTS

| | | | | |
|---|---|---|---|---|
| GB | 203010 | * | 8/1923 | ................... 464/161 |
| JP | 2003-193855 | | 7/2003 | |

OTHER PUBLICATIONS

Canadian Office Action dated Mar. 15, 2018, 5 pages.

* cited by examiner

*Primary Examiner* — Greg Binda
(74) *Attorney, Agent, or Firm* — Rankin, Hill & Clark LLP

(57) ABSTRACT

A cam-type damper 118 includes a drive cam 131 provided on a clutch shaft 114 without capability of relative rotation and a driven cam 132 provided on a main shaft 103 without capability of relative rotation. The clutch shaft 114 contains a shaft end of the main shaft 103 and the main shaft 103 is rotatably supported on the inner circumferential surface of the clutch shaft 114. The driven cam 132 provided on the main shaft 103 is disposed between a front end surface 114$g$ of the clutch shaft 114 and a rear end surface 103$h$ of a main shaft gear 103$d$ provided on the main shaft 103 and the movement of the driven cam 132 in the axial direction is restricted.

13 Claims, 12 Drawing Sheets

US 10,393,188 B2

VEHICLE TRANSMISSION STRUCTURE

INCORPORATION BY REFERENCE

The present application claims priority under 35 U.S.C. § 119 to Japanese Patent Application No. 2016-055936 filed on Mar. 18, 2016. The content of this application is incorporated herein by reference in its entirety.

TECHNICAL FIELD

The present invention relates to a vehicle transmission structure.

BACKGROUND ART

Conventionally, in transmissions having a cam-type torque damper, there is a transmission in which a pair of cam members of the torque damper are disposed on an extension of the center line of a main shaft (for example, refer to Patent Document 1).

In this structure, one cam member of the pair of cam members is provided on the main shaft side and the other cam member is provided on the output shaft side of a clutch that rotates coaxially with the main shaft. The respective cam members are rotationally interlocked while permitting relative positional deviation in the rotational direction and alleviating transmission of excessive rotational torque by the cam mechanism.

PRIOR ART DOCUMENT

Patent Document

[Patent Document 1]
Japanese Patent Laid-Open No. 2003-193855

SUMMARY OF THE INVENTION

Problem to be Solved by the Invention

As in Patent Document 1, the pair of cam members of the torque damper are fixed to the respective shaft ends of the output shaft of the clutch and the main shaft and the total length of the torque damper is set long over the whole interval between a pair of bearings provided in a crankcase. Thus, there is a problem that the distance between the pair of bearings of the crankcase becomes large and, in association with this, the size of a gear shift shaft composed of the output shaft of the clutch and the main shaft increases as a whole.

An object of the present invention is to provide a vehicle transmission structure with which a fixing structure of cam members of a cam-type torque damper disposed on a gear shift shaft can be simplified and increase in the size of the gear shift shaft can be suppressed.

Means for Solving the Problem

In order to solve the above-described problems, an aspect of the present invention provides a vehicle transmission structure in which a power unit (16) that includes an internal combustion engine (81) and a transmission (82) and generates a driving force is provided with a drive shaft (114) that receives generation of rotational torque of the internal combustion engine (81) and rotates, a driven shaft (103) provided in the transmission (82) to receive rotation of the drive shaft (114) and be driven in an interlocked manner, and a cam-type damper (118) that is provided between the drive shaft (114) and the driven shaft (103) and is capable of absorbing relative positional deviation in the rotational direction between the drive shaft (114) and the driven shaft (103) due to rotational torque received from the drive shaft (114). The vehicle transmission structure is characterized by having the following configuration. The cam-type damper (118) includes a drive-side cam member (131) provided on the drive shaft (114) without capability of relative rotation and a driven-side cam member (132) provided on the driven shaft (103) without capability of relative rotation. One shaft (114) of the drive shaft (114) and the driven shaft (103) contains a shaft end of the other shaft (103) and the other shaft (103) is rotatably supported on an inner circumferential surface of the one shaft (114). The drive-side cam member (131) or the driven-side cam member (132) provided on the other shaft (103) is disposed between an end surface (114g) of the one shaft (114) and a side surface of an annular protrusion part (103d) provided on the other shaft (103) and the movement of the drive-side cam member (131) or the driven-side cam member (132) in the axial direction is restricted.

The vehicle transmission structure is characterized in that, in the above-described configuration, one cam member (132) of the drive-side cam member (131) and the driven-side cam member (132) is positioned by being pressed against an end surface (103h) of the annular protrusion part (103d) with the intermediary of the other cam member (131) by a biasing unit (134).

Furthermore, in the above-described configuration, the annular protrusion part (103d) may be a gear (103d) provided on the other shaft (103) without capability of movement in the axial direction.

Moreover, in the above-described configuration, a disc spring (134) may be used as a biasing unit for the other cam member (131) of the drive-side cam member (131) and the driven-side cam member (132) in the axial direction, and the disc spring (134) may be disposed on the one shaft (114) or the other shaft (103) and be positioned by being sandwiched by the other cam member (131) that abuts against the disc spring (134) and one end surface of another annular protrusion part (114e) provided on the one shaft (114).

In addition, in the above-described configuration, in the disc spring (134), an inner circumferential edge (134a) may be used as an abutting part that abuts against one end surface (114t) of the other annular protrusion part (114e).

Furthermore, in the above-described configuration, the other end surface (114u) of the other annular protrusion part (114e) may abut against a side surface of a bearing member (113) that rotatably supports the one shaft (114), and the other annular protrusion part (114e) may be used as a thrust restricting part that restricts the movement of the one shaft (114) in the axial direction.

Moreover, in the above-described configuration, plural disc springs may be overlapped with each other as the disc springs (134) and the disc springs (134) may be so disposed that an abutting part of the disc spring (134) that abuts against the other cam member (131) is an outer circumferential edge.

In addition, in the above-described configuration, in the drive shaft (114) and the driven shaft (103), oil lubrication holes (114m, 103f) that penetrate between the inside and outside of the shaft may be made in a range in which the other cam member (131) is slid in the axial direction.

Furthermore, in the above-described configuration, in both of the drive shaft (114) and the driven shaft (103), the oil lubrication holes (114*m*, 103*f*) that penetrate between inside and outside of both shafts (114, 103) are disposed to be located at the same position in the axial direction and communicate with each other in a range in which the one shaft (114) contains the other shaft (103).

Effects of the Invention

The cam-type damper of the present invention includes the drive-side cam member provided on the drive shaft without capability of relative rotation and the driven-side cam member provided on the driven shaft without capability of relative rotation. Furthermore, one shaft of the drive shaft and the driven shaft contains the shaft end of the other shaft and the other shaft is rotatably supported on the inner circumferential surface of the one shaft. Moreover, the drive-side cam member or the driven-side cam member provided on the other shaft is disposed between the end surface of the one shaft and the side surface of the annular protrusion part provided on the other shaft and the movement of the drive-side cam member or the driven-side cam member in the axial direction is restricted. Therefore, the movement of the cam member in the axial direction is restricted by utilizing the end surface of the shaft on one side. Thus, a special positioning structure is unnecessary and the structure is simplified. This can suppress size increase in the axial direction as the whole of the drive shaft on the input side and the driven shaft on the output side.

Furthermore, one cam member of the drive-side cam member and the driven-side cam member is positioned by being pressed against the end surface of the annular protrusion part with the intermediary of the other cam member by the biasing unit. Therefore, the positioning of the cam member in the axial direction is carried out by utilizing the pressing force of the biasing unit. Thus, due to simplification of the positioning structure, size increase in the axial direction as the whole of the drive shaft on the input side and the driven shaft on the output side can be suppressed.

Moreover, the annular protrusion part is the gear provided on the other shaft without capability of movement in the axial direction. Thus, by restricting the movement of the cam member in the axial direction by utilizing the gear provided on the other shaft, a load generated in the axial direction of the cam member due to reception of high torque can be sufficiently received.

In addition, the disc spring is used as the biasing unit for the other cam member of the drive-side cam member and the driven-side cam member in the axial direction, and the disc spring is disposed on the one shaft or the other shaft and is positioned by being sandwiched by the other cam member that abuts against this disc spring and the one end surface of the other annular protrusion part provided on the one shaft. Thus, by using the disc spring as the biasing unit and positioning the disc spring by sandwiching the disc spring by the other cam member and the other annular protrusion part provided on the one shaft, the positioning structure can be simplified in addition to the use of the disc spring having a simple shape. This can suppress further size increase in the axial direction.

Furthermore, in the disc spring, the inner circumferential edge is used as the abutting part that abuts against the one end surface of the other annular protrusion part. Thus, the radius of the part at which the disc spring abuts against the other annular protrusion part can be set small and the outer diameter of the other annular protrusion part can be set small, which can suppress weight increase.

Moreover, the other end surface of the other annular protrusion part abuts against the side surface of the bearing member that rotatably supports the one shaft, and the other annular protrusion part is used as a thrust restricting part that restricts the movement of the one shaft in the axial direction. Thus, positioning of the disc spring and restriction of the movement of the one shaft in the axial direction can be carried out by the other annular protrusion part and increase in the shaft length can be suppressed.

In addition, plural disc springs are overlapped with each other as the disc springs and the disc springs are so disposed that the abutting part of the disc spring that abuts against the other cam member is the outer circumferential edge. Thus, a wide range can be ensured as the range of the load that acts on the other cam member and the pressing force of the cam member against transmitted torque can be sufficiently ensured. Furthermore, the other cam member can be stably pressed by the disc springs.

Furthermore, in the drive shaft and the driven shaft, the oil lubrication holes that penetrate between the inside and outside of the shaft are made in the range in which the other cam member is slid in the axial direction. Thus, oil can be supplied from the inside of the drive shaft and the driven shaft to the range of the slide of the other cam member in the axial direction through the oil lubrication holes, so that the lubrication performance can be ensured.

Moreover, in both of the drive shaft and the driven shaft, the oil lubrication holes that penetrate between the inside and outside of both shafts are disposed to be located at the same position in the axial direction and communicate with each other in the range in which the one shaft contains the other shaft. Thus, the oil inside the shafts can be supplied also to the slide site between both shafts in addition to the other cam member. This can ensure the lubrication performance for the slide site of the other cam member and the shaft slide site between both shafts.

MODE FOR CARRYING OUT THE INVENTION

One embodiment of the present invention will be described below with reference to the drawings. In the description, directions such as front, rear, left, right, upward, and downward directions are the same as directions with respect to the vehicle body unless otherwise noted. Furthermore, symbol FR shown in the respective drawings indicates the vehicle body front side. In addition, symbol UP indicates the vehicle body upper side and symbol LH indicates the vehicle body left side.

Figure 1:
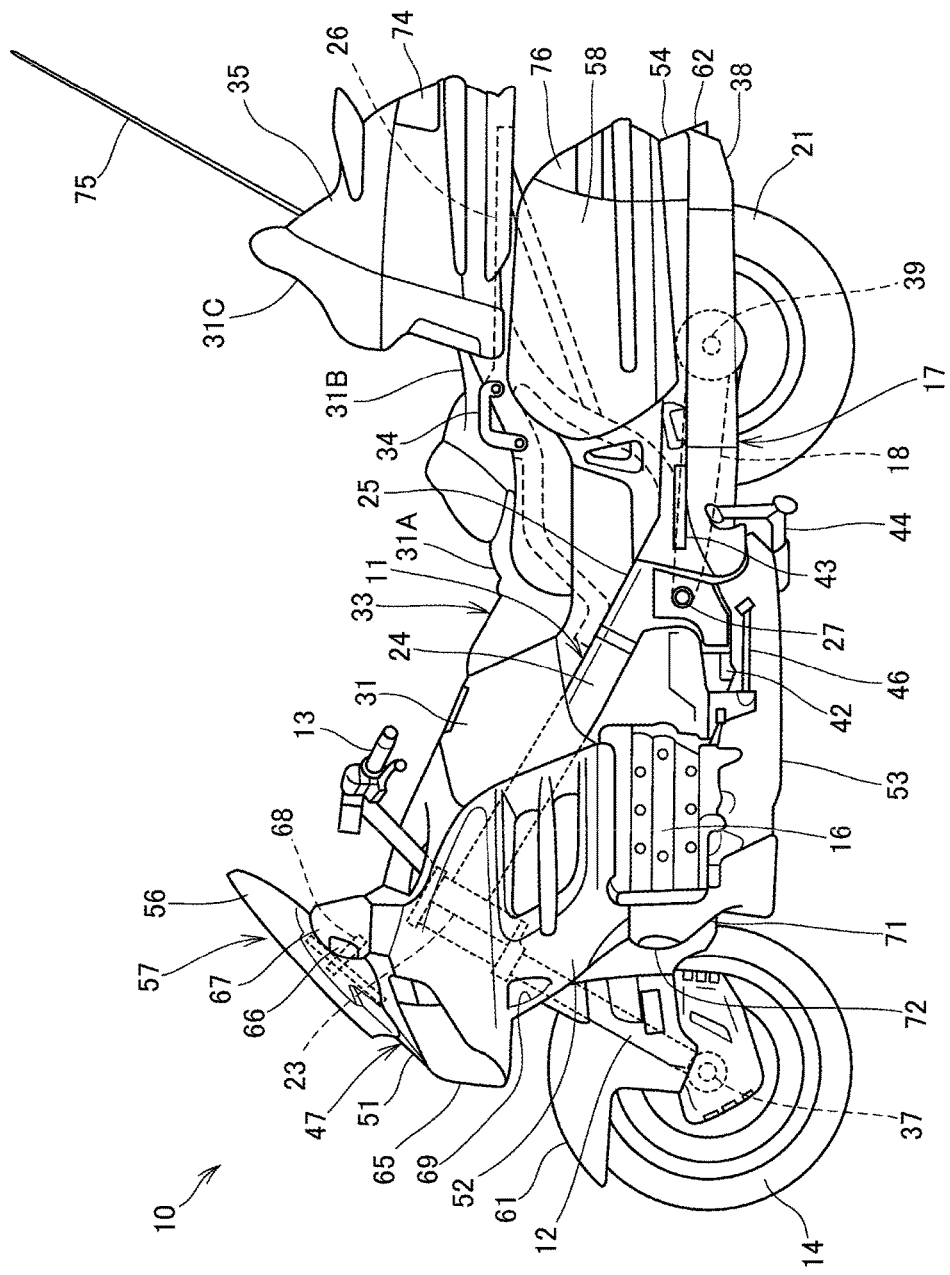
FIG. 1 is a left side view showing a motorcycle including a vehicle transmission structure of the present invention.

FIG. 1 is a left side view showing a motorcycle 10 including the vehicle transmission structure of the present invention.

A motorcycle 10 includes a vehicle body frame 11, a front fork 12, a handlebar 13, a front wheel 14, a power unit 16, an exhaust system 17, a rear fork 18, and a rear wheel 21.

The vehicle body frame 11 includes a head pipe 23, a pair of left and right main frames 24, a pair of left and right pivot plates 25, and a pair of left and right seat rails 26.

The head pipe 23 is disposed at the front end part of the vehicle body frame 11 and supports the front fork 12 steerably. The main frames 24 extend from the head pipe 23 toward the rear lower side obliquely on the left and right sides. The power unit 16 is supported under the main frames 24 and a fuel tank 31 is supported over the main frames 24. The pivot plates 25 are connected to the rear parts of the main frames 24. The seat rails 26 extend toward the rear upper side obliquely from the front parts and rear parts of the pivot plates 25. A seat 33 is supported on the front parts of the seat rails 26 and a grab rail 34 and a trunk box 35 are supported on the rear parts of the seat rails 26.

The handlebar 13 is attached to the upper part of the front fork 12 and the front wheel 14 is supported at the lower part of the front fork 12 with the intermediary of an axle 37. The exhaust system 17 includes an exhaust pipe (not shown) extending from the power unit 16 and a muffler 38 attached to the rear end of the exhaust pipe.

The rear fork 18 is vertically swingably supported by a pivot shaft 27 provided on the pivot plates 25 and the rear wheel 21 is supported by an axle 39 provided at the rear end part of the rear fork 18. A rear cushion unit (not shown) is provided between the rear end part of the rear fork 18 and the vehicle body frame 11.

The seat 33 includes a driver seat 31A that is disposed on the rear side of the fuel tank 31 and on which a driver sits, a pillion passenger seat 31B that is formed with a larger height on the rear side of the driver seat 31A and on which a pillion passenger sits, and a backrest part 31C for the pillion passenger. Furthermore, to the pivot plates 25 of the vehicle body frame 11, a pair of left and right driver steps 42 on which the driver puts feet and a pair of left and right pillion passenger steps 43 on which the pillion passenger puts feet are attached. Moreover, a main stand 44, a side stand 46, and a vehicle body cover 47 are attached to the vehicle body frame 11.

The vehicle body cover 47 includes a front cowl 51 that covers the vehicle body front side, a pair of left and right side cowls 52 that cover the vehicle body side parts, an under cowl 53 that covers the vehicle body lower part, and a rear cowl 54 that covers the vehicle body rear part. The front cowl 51 is provided with a windproof system 57 that vertically moves a windscreen 56 automatically. A pair of left and right side backs 58 are formed monolithically with the rear cowl 54. Furthermore, a front fender 61 that covers the front wheel 14 from above is attached to the front fork 12 and a rear fender 62 that covers the rear wheel 21 from above is attached to the rear cowl 54.

On the front cowl 51, a headlight 65 is provided on the front surface, and the windscreen 56 is provided at the upper part, and a pair of left and right mirrors 67 in which front blinkers 66 are incorporated are provided at the left and right ends. A meter 68 is disposed inside the front cowl 51.

In the side cowls 52, a pair of left and right air openings 69 for supplying external air from the vehicle front side to the periphery of the power unit 16 are made. Furthermore, a pair of left and right engine guards 71 are provided on the left and right front sides of the power unit 16 and a fog lamp 72 is attached to each of the engine guards 71.

On the trunk box 35, a pair of left and right tail lamp units 74 are provided on the back surface and a rod antenna 75 used in receiving a radio broadcast by an audio unit is provided at the right side part. Rear blinkers 76 are disposed on the back surfaces of the side backs 58.

Figure 2:
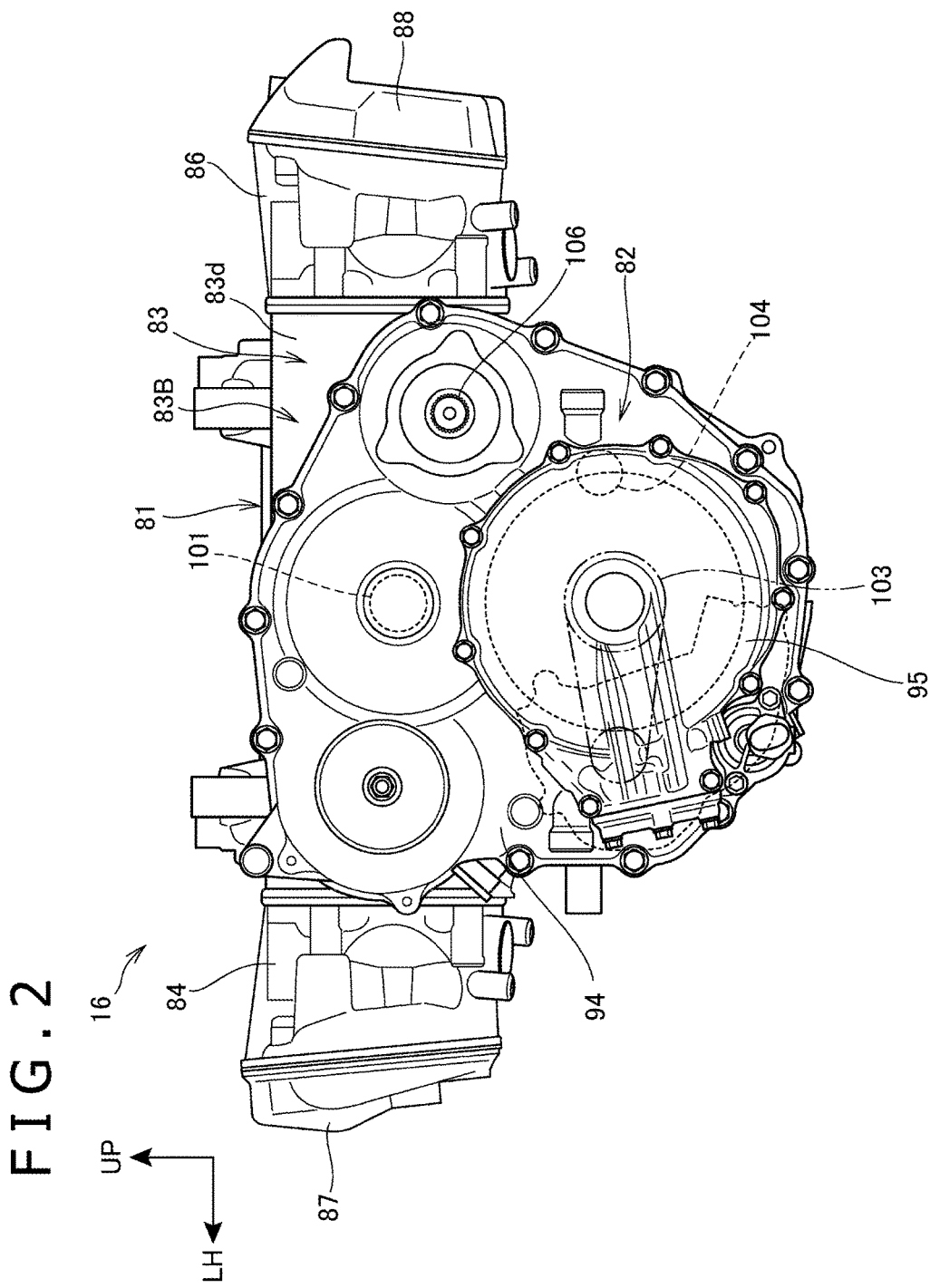
FIG. 2 is a back view showing a power unit.
Figure 3:
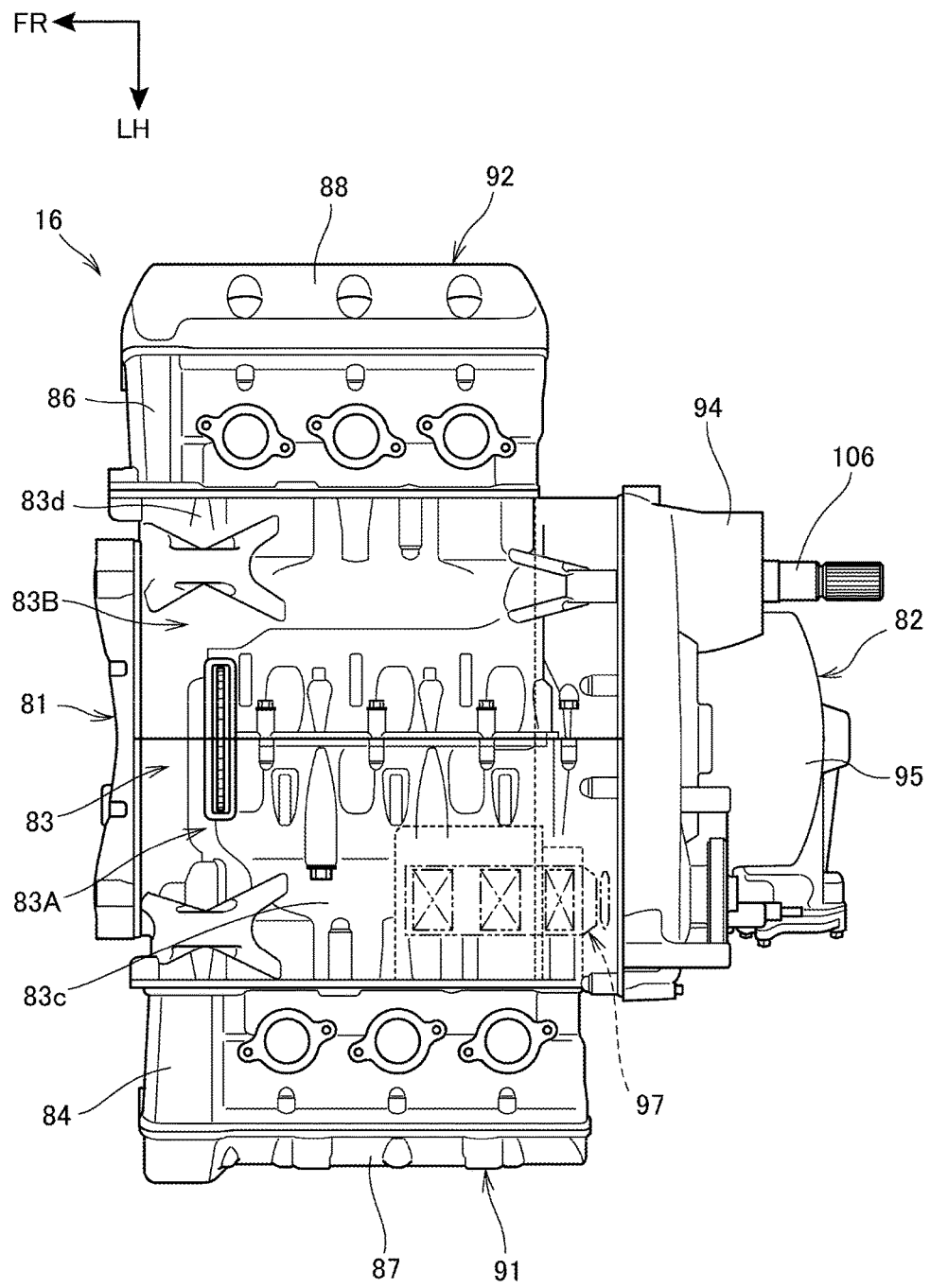
FIG. 3 is a plan view showing the power unit.

FIG. 2 is a back view showing the power unit 16. FIG. 3 is a plan view showing the power unit 16.

As shown in FIG. 2 and FIG. 3, the power unit 16 includes an internal combustion engine 81 that forms the upper part and a transmission 82 provided integrally with the lower part and rear part of the internal combustion engine 81.

The internal combustion engine 81 is a horizontally-opposed engine and includes a crankcase 83 provided at the center in the vehicle width direction, a left cylinder head 84 and a right cylinder head 86 attached to the outside of the crankcase 83 in the vehicle width direction in such a manner as to horizontally extend, and a left head cover 87 and a right head cover 88 that seal openings of the left cylinder head 84 and the right cylinder head 86, respectively.

The crankcase 83 is composed of a left case 83A and a right case 83B separated to the left and right sides. A left end part 83c that protrudes leftward in the left case 83A, the left cylinder head 84, and the left head cover 87 form a left cylinder unit 91. Furthermore, a right end part 83d that protrudes rightward in the right case 83B, the right cylinder head 86, and the right head cover 88 form a right cylinder unit 92.

A rear crank cover 94 is attached to the rear end surface of the crankcase 83. Furthermore, a clutch cover 95 that bulges into a bowl shape toward the vehicle body rear side is attached to the center of the lower part of the rear crank cover 94. A clutch 112 (see FIG. 4) is disposed inside the clutch cover 95. Symbol 97 denotes an oil pump unit provided in the left case 83A.

The internal combustion engine 81 includes a crankshaft 101 housed in the crankcase 83 to extend in the vehicle front-rear direction. Furthermore, the transmission 82 includes a main shaft 103 below the crankshaft 101, a countershaft 104 on the right side of the main shaft 103, and an output shaft 106 on the right upper side of the countershaft 104 obliquely. The main shaft 103, the countershaft 104, and the output shaft 106 are each disposed in parallel to the crankshaft 101.

The main shaft 103 and the countershaft 104 are provided with gear trains of plural stages with which selective power transmission at different gear ratios is possible. The combination of meshing of gear elements in these gear trains is changed as appropriate by shift operation by a driver. The output shaft 106 protrudes from the rear crank cover 94 toward the vehicle body rear side. The output shaft 106 receives power from the countershaft 104 and rotates to transmit the rotation to the rear wheel 21 (see FIG. 1) through power transmitting members such as a drive shaft.

Figure 4:
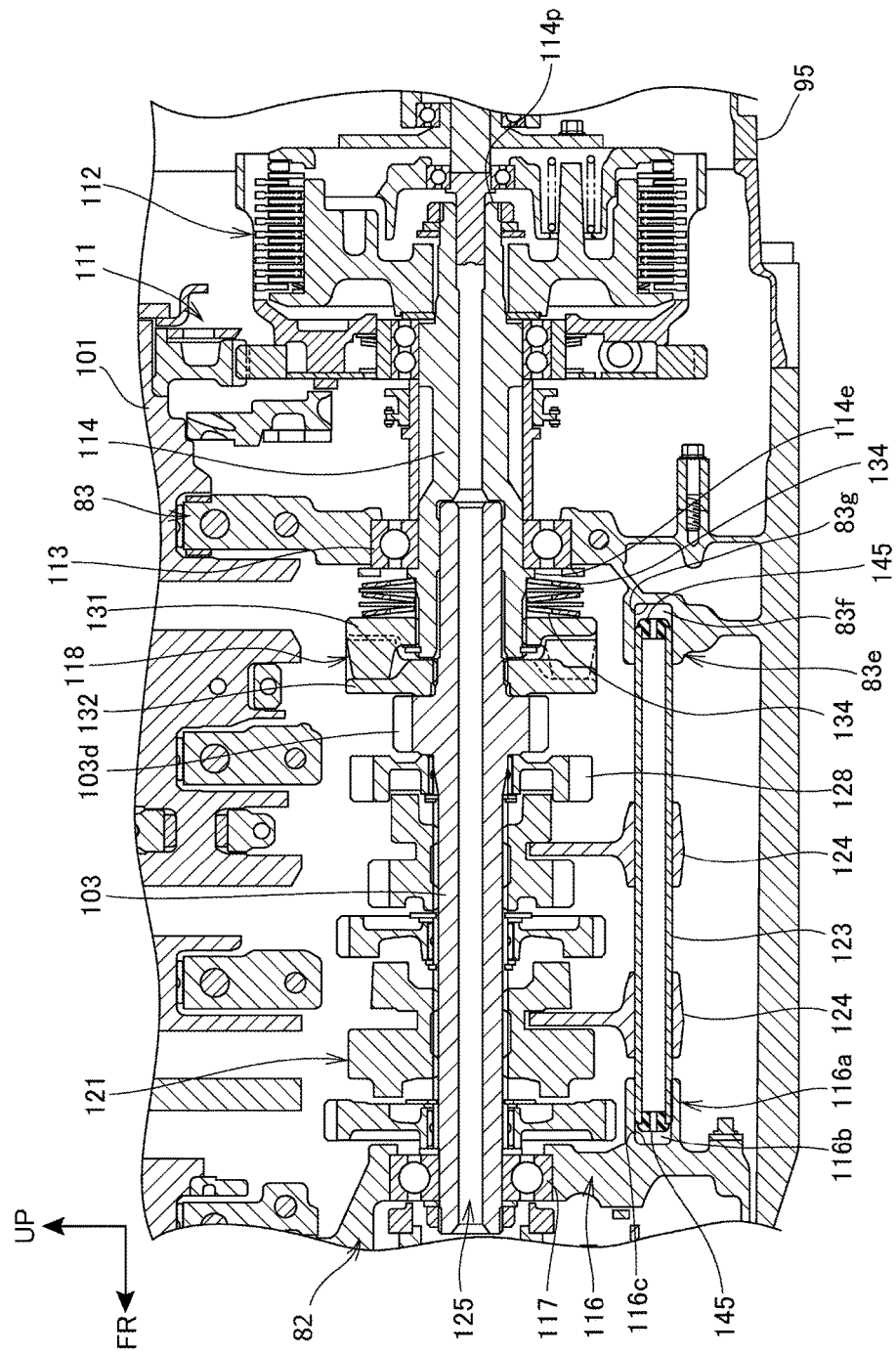
FIG. 4 is a sectional view showing the major part of the power unit.

FIG. 4 is a sectional view showing the major part of the power unit 16.

The transmission 82 includes a reduction gear 111, the clutch 112, a clutch shaft 114, the main shaft 103, a transmission holder 116, a cam-type damper 118, a main shaft gear group 121, a shift fork shaft 123, and plural shift forks 124.

The power of the crankshaft 101 is transmitted to the input side of the clutch 112 via the reduction gear 111. One end of the clutch shaft 114 is attached to the output side of the clutch 112 and the intermediate part of the clutch shaft 114 is supported by a bearing 113 provided in the crankcase 83.

One end of the main shaft 103 is relatively rotatably supported by the other end of the clutch shaft 114 and the other end of the main shaft 103 is supported by the transmission holder 116 provided in the crankcase 83 as a separate body with the intermediary of a bearing 117. The above-described clutch shaft 114 and main shaft 103 form a gear shift shaft 125.

The cam-type damper 118 is provided between the clutch shaft 114 and the main shaft 103. When excessive torque surpassing predetermined torque or torque variation is input from the clutch shaft 114 to the main shaft 103, the cam-type damper 118 relatively rotates to alleviate transmission of the excessive torque or torque variation to the main shaft 103. The main shaft gear group 121 is composed of plural transmission gears provided on the main shaft 103.

The shift fork shaft 123 is a hollow shaft whose both end parts are supported by a shaft support part 83e formed in the crankcase 83 and a shaft support part 116a formed in the transmission holder 116. The shift forks 124 are movably supported by the shift fork shaft 123. In addition, based on gear shift operation, the shift forks 124 allow selection of the gear shift stage by moving a predetermined transmission gear in the main shaft gear group 121 in the axial direction on the main shaft 103 in association with rotation of a shift drum (not shown).

Figure 5:
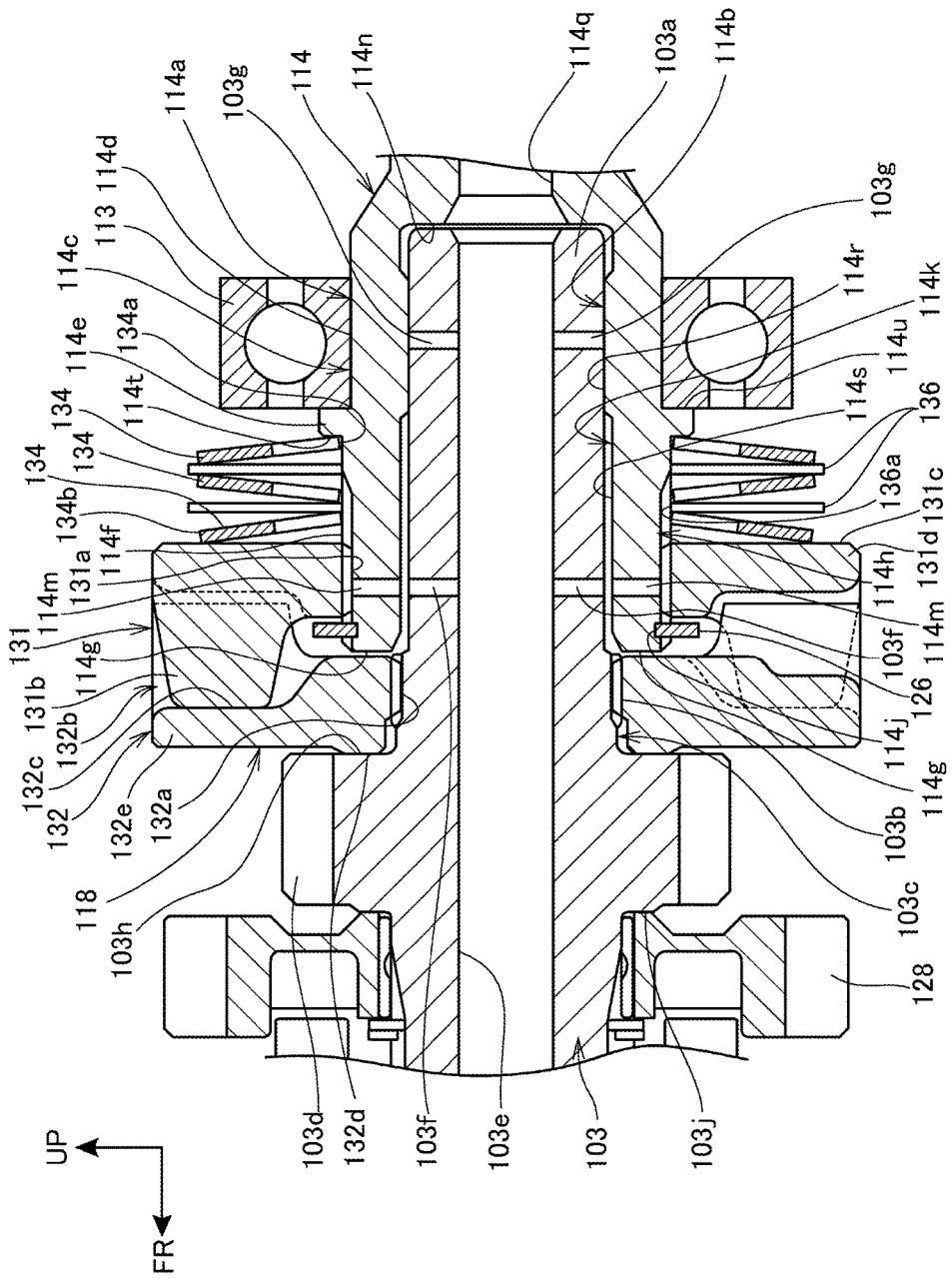
FIG. 5 is a sectional view showing the structure of a cam-type damper and the surroundings thereof.

FIG. 5 is a sectional view showing the structure of the cam-type damper 118 and the surroundings thereof.

In the clutch shaft 114, a larger-diameter part 114a supported by the bearing 113 is provided and a shaft fitting hole 114b is formed inside the larger-diameter part 114a in the radial direction.

The larger-diameter part 114a includes, in an outer circumferential surface 114c thereof, a bearing fitting part 114d, an annular protrusion part 114e, a spline-formed part 114h, and an annular groove 114j.

The bearing 113 is fitted to the bearing fitting part 114d. The annular protrusion part 114e is formed to protrude into an annular shape at an end part of the bearing fitting part 114d and a rear end surface 114u of the annular protrusion part 114e is positioned at a side surface of the bearing 113. That is, positioning of the clutch shaft 114 in the axial direction is made by the bearing 113 through the annular protrusion part 114e. In the spline-formed part 114h, male splines 114f are formed from a front end surface 114g to the vicinity of the annular protrusion part 114e. The annular groove 114j is a part formed in order to fit a retaining ring 126 to the vicinity of the front end surface 114g of the spline-formed part 114h.

Furthermore, in the larger-diameter part 114a, oil holes 114m that penetrate to be open to the surface of the spline-formed part 114h and an inner circumferential surface 114k of the shaft fitting hole 114b (specifically, larger-diameter hole 114s to be described below) are formed. By the oil holes 114m, oil for lubrication is supplied to the space between the male splines 114f and the cam-type damper 118.

A shaft through-hole 114q that extends in the axial direction from a bottom part 114n of the shaft fitting hole 114b to a rear end surface 114p (see FIG. 4) of the clutch shaft 114 is opened.

The inner circumferential surface 114k of the shaft fitting hole 114b has a smaller-diameter hole 114r made on the side of the bottom part 114n and the larger-diameter hole 114s that is adjacent to the smaller-diameter hole 114r and is set to have a larger diameter than the smaller-diameter hole 114r.

The main shaft 103 includes a fitting shaft part 103a fitted to the shaft fitting hole 114b of the clutch shaft 114, a spline-formed part 103c that is adjacent to the fitting shaft part 103a and is located outside the shaft fitting hole 114b and in which male splines 103b are formed, and a main shaft gear 103d formed to protrude outward in the radial direction from an end part of the spline-formed part 103c.

The fitting shaft part 103a is formed to have a constant outer diameter and is rotatably fitted to the smaller-diameter hole 114r of the shaft fitting hole 114b of the clutch shaft 114. In the fitting shaft part 103a, a shaft through-hole 103e that extends in the axial direction and oil holes 103f and 103g made as through-holes that are open to each of the outer circumferential surface of the fitting shaft part 103a and the shaft through-hole 103e are formed. Both of the oil holes 103f and 103g are formed as plural holes in the circumferential direction. One oil hole 103f is formed to communicate with the larger-diameter hole 114s at the position that overlaps with the oil hole 114m of the clutch shaft 114 in the axial direction of the main shaft 103. The other oil hole 103g is formed to face the smaller-diameter hole 114r of the clutch shaft 114. The shaft through-hole 103e communicates with the shaft through-hole 114q of the clutch shaft 114.

The main shaft gear 103d is a part that meshes with a gear provided on the countershaft 104 (see FIG. 2) and a transmission gear 128 that forms the main shaft gear group 121 (see FIG. 4) is adjacent to the side of a front end surface 103j of the main shaft gear 103d.

The cam-type damper 118 is composed of a drive cam 131, a driven cam 132, and plural disc springs 134. The drive cam 131 is splined to the spline-formed part 114h of the clutch shaft 114. The driven cam 132 is splined to the spline-formed part 103c of the main shaft 103 in such a manner as to mesh with the drive cam 131 in the circumferential direction. The disc springs 134 press the drive cam 131 against the driven cam 132 by the elastic force thereof. The respective configurations of the cam-type damper 118 will be described in detail below.

The drive cam 131 includes a disc part 131d having a circular disc shape, female splines 131a formed at the center of the disc part 131d, and plural engagement convex parts 131b that protrude in the axial direction (front side) of the clutch shaft 114. The female splines 131a are splined to the male splines 114f of the spline-formed part 114h. The drive cam 131 is incapable of rotating relative to the spline-formed part 114h and is movable in the axial direction. The forward movement of the drive cam 131 in the axial direction is restricted by the retaining ring 126 and the drive cam 131 is biased forward from the rear side by the plural disc springs 134.

The driven cam 132 includes a disc part 132e having a circular disc shape, female splines 132a formed at the center of the disc part 132e, and an engagement concave part 132b that dents in the axial direction (front side) of the main shaft 103. The female splines 132a are splined to the male splines 103b of the spline-formed part 103c. The driven cam 132 is incapable of rotating relative to the spline-formed part 103c and is movable in the axial direction. A rear end surface 103h of the main shaft gear 103d of the main shaft 103 is located on the front side of the driven cam 132 and the front end surface 114g of the clutch shaft 114 is located on the rear side of the driven cam 132. Thus, the driven cam 132 is disposed between the main shaft gear 103d and the clutch shaft 114 and the movement thereof in the axial direction is restricted, i.e. the driven cam 132 is positioned. The engagement concave part 132b is in the state of engaging with the engagement convex part 131b of the drive cam 131 and is so configured that the rotation of the clutch shaft 114 can be transmitted to the main shaft 103.

Inner circumferential edges 134*a* of the plural disc springs 134 are fitted to the spline-formed part 114*h* of the clutch shaft 114. In addition, the plural disc springs 134 are disposed between the annular protrusion part 114*e* and an end surface 131*c* of the drive cam 131. Between the disc springs 134, 134 adjacent to each other, washers 136 whose inner circumferential edges 136*a* are fitted to the spline-formed part 114*h* are disposed.

The inner circumferential edge 134*a* of the disc spring 134 disposed closest to the annular protrusion part 114*e* among the plural disc springs 134 is made to abut against a front end surface 114*t* of the annular protrusion part 114*e*, and an outer circumferential edge 134*b* of the disc spring 134 disposed closest to the drive cam 131 is made to abut against the end surface 131*c* of the drive cam 131.

Each disc spring 134 is in the state of bending in the axial direction of the clutch shaft 114 relative to the state before the disc springs 134 are assembled with the clutch shaft 114. Due to this, the engagement convex part 131*b* of the drive cam 131 is pressed against a bottom surface 132*c* formed in the engagement concave part 132*b* of the driven cam 132 by the elastic force of each disc spring 134. Furthermore, an end surface 132*d* of the driven cam 132 is also pressed against the rear end surface 103*h* of the main shaft gear 103*d*.

As described above, the driven cam 132 is disposed between the front end surface 114*g* of the clutch shaft 114 and the main shaft gear 103*d* monolithic with the main shaft 103 and is pressed against the main shaft gear 103*d* by the elastic force of the plural disc springs 134. Due to this, the movement of the driven cam 132 in the axial direction is restricted and the driven cam 132 is positioned. This can make the whole length of a shaft member composed of the clutch shaft 114 and the main shaft 103 joined to extend in the axial direction being shorter than the whole length of the conventional shaft member and can compactly form the cam-type damper 118.

Furthermore, due to the provision of the washers 136 between the disc springs 134, 134 adjacent to each other, the position of each disc spring 134 becomes more stable compared with the case in which the disc springs 134, 134 are in contact with each other and the amount of bending of each disc spring 134 becomes constant. Thus, the setting load set based on the respective disc springs 134 can be easily obtained. That is, characteristics of torque transmitted from the drive cam 131 to the driven cam 132 can be stabilized.

Figure 6:
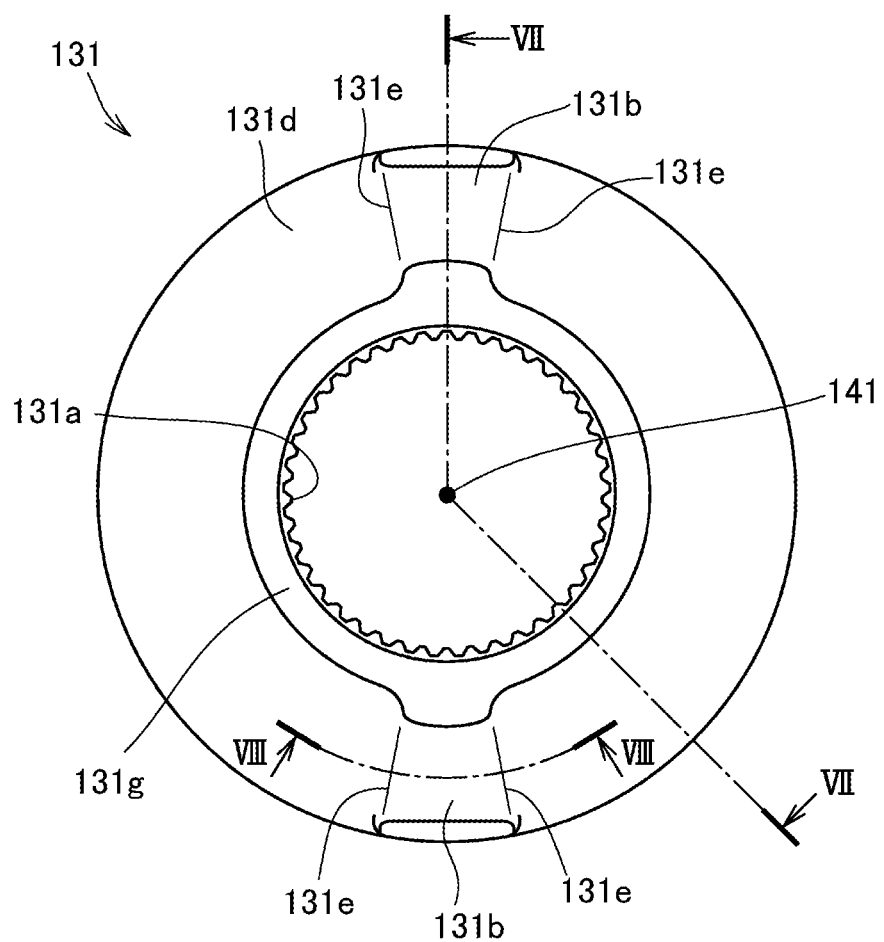
FIG. 6 is a front view showing a drive cam.
Figure 7:
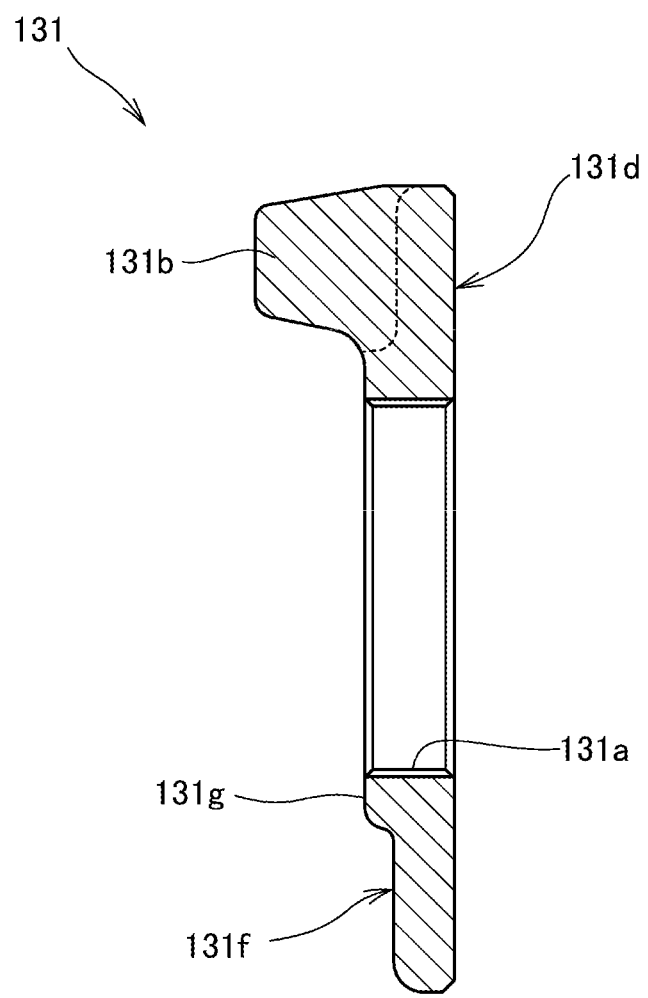
FIG. 7 is a sectional view along line VII-VII in FIG. 6.
Figure 8:
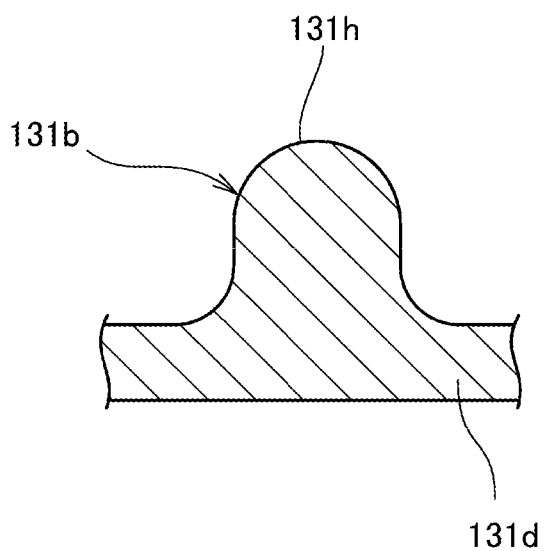
FIG. 8 is a sectional view along line VIII-VIII in FIG. 6.

FIG. 6 is a front view showing the drive cam 131. FIG. 7 is a sectional view along line VII-VII in FIG. 6. FIG. 8 is a sectional view along line VIII-VIII in FIG. 6.

As shown in FIG. 6, the drive cam 131 is composed of the circular-disc-shaped disc part 131*d* in which the female splines 131*a* are formed at the central part and the plural engagement convex parts 131*b* that protrude in the axial direction (front side and near side of the diagram) from the disc part 131*d* and are provided at an equal interval in the circumferential direction of the disc part 131*d*.

In the present embodiment, the engagement convex parts 131*b* are formed at every 180° in the circumferential direction. In plan view, the contour of the engagement convex part 131*b* is formed into a trapezoidal shape and side surfaces 131*e*, 131*e* on both sides of the engagement convex part 131*b* extend in a planar manner toward center 141 of the disc part 131*d*.

As shown in FIG. 7, in the disc part 131*d*, in an end surface 131*f* on the side toward which the engagement convex parts 131*b* protrude, an annular part 131*g* that greatly protrudes in the same direction as the engagement convex parts 131*b* is formed outside in the radial direction relative to the female splines 131*a*. Due to this, the length of the female splines 131*a* in the axial direction can be ensured. In addition, the wall thickness of the disc part 131*d* other than the annular part 131*g* can be set small and weight reduction can be achieved. The engagement convex parts 131*b* are formed into a trapezoidal shape as a sectional shape.

As shown in FIG. 8, a tip part 131*h* of the engagement convex part 131*b* is formed into a curved surface (specifically, circular arc surface) that is convex in such a direction as to get farther from the disc part 131*d*. By forming the tip part 131*h* into the curved surface in this manner, friction when the tip part 131*h* moves in the circumferential direction while pressing the driven cam 132 (see FIG. 5) can be reduced and getting stuck with the driven cam 132 can be suppressed. This enables smooth slide with the driven cam 132.

Figure 9:
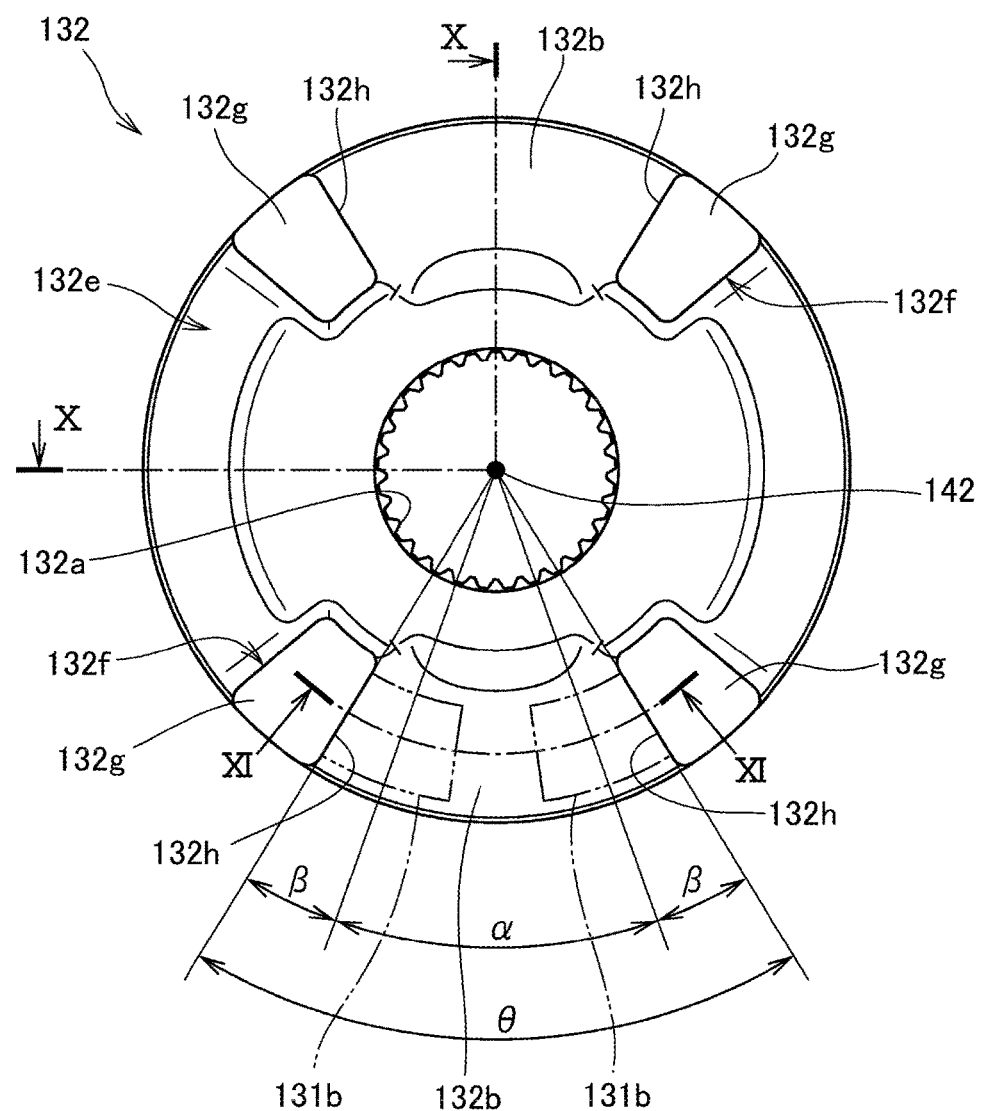
FIG. 9 is a front view showing a driven cam.
Figure 10:
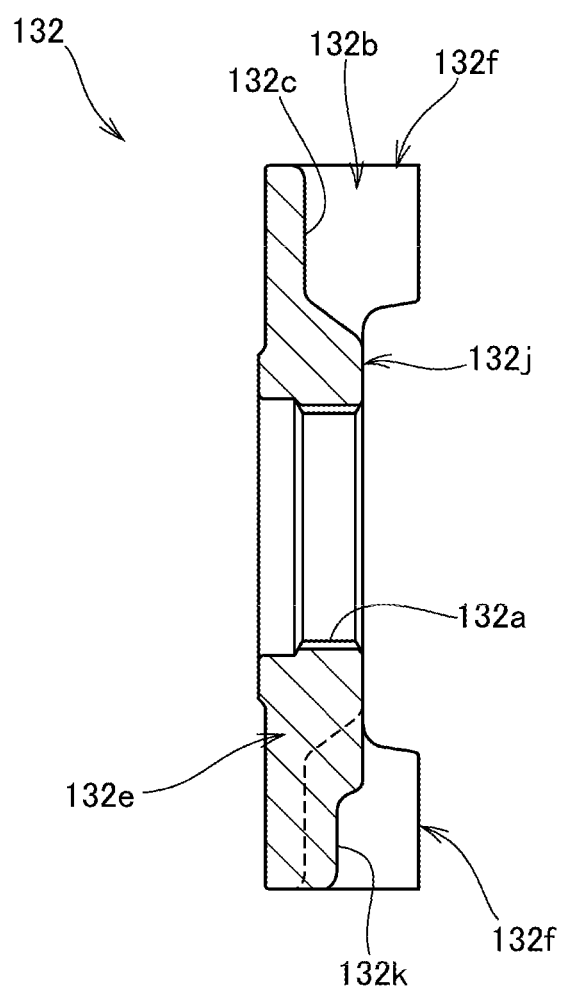
FIG. 10 is a sectional view along line X-X in FIG. 9.
Figure 11:
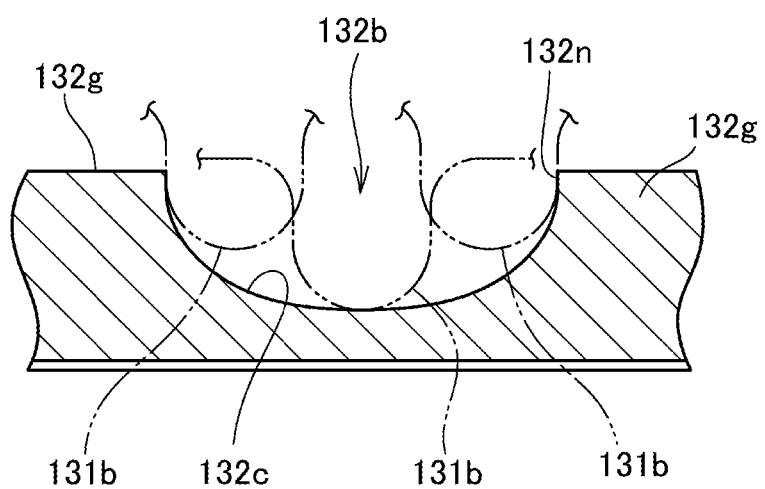
FIG. 11 is a sectional view along line XI-XI in FIG. 9.

FIG. 9 is a front view showing the driven cam 132. FIG. 10 is a sectional view along line X-X in FIG. 9. FIG. 11 is a sectional view along line XI-XI in FIG. 9.

As shown in FIG. 9, the driven cam 132 is composed of the circular-disc-shaped disc part 132*e* in which the female splines 132*a* are formed and plural engagement parts 132*f* that are formed with a larger height than the disc part 132*e* and are provided at an equal interval in the circumferential direction.

The engagement concave part 132*b* is formed in the engagement part 132*f*. Due to this, a pair of convex-shaped base parts 132*g*, 132*g* are formed at both end parts of the engagement part 132*f*. In the present embodiment, the engagement parts 132*f* are formed at every 180° in the circumferential direction. Side surfaces 132*h*, 132*h* on the side of the engagement concave part 132*b* in the pair of base parts 132*g*, 132*g* in plan view extend in a planar manner toward center 142 of the disc part 132*e*.

The engagement concave part 132*b* is formed in a range of an angle θ and the angle equivalent to half the width of the engagement convex part 131*b* of the drive cam 131 (see FIG. 6) engaged in this engagement concave part 132*b* is β. The pivot angle of the engagement convex part 131*b* in the case in which the engagement convex part 131*b* abuts against the base parts 132*g*, 132*g* on both sides in the engagement concave part 132*b*, i.e. the maximum pivot angle, is α.

As shown in FIG. 10, in the disc part 132*e* of the driven cam 132, an annular concave part 132*k* formed with a shallower depth than the bottom surface 132*c* of the engagement concave part 132*b* is formed on the outer circumferential side of an end surface 132*j* on the side toward which the engagement parts 132*f* protrude. Furthermore, the female splines 132*a* are so formed as to be biased toward the side toward which the engagement parts 132*f* protrude in the width of the disc part 132*e* in the axial direction. By bringing the female splines 132*a* closer to the engagement parts 132*f* in this manner, torque transmitted from the drive cam 131 (see FIG. 7) to the engagement parts 132*f* can be efficiently transmitted to the main shaft 103 (see FIG. 5) through the female splines 132*a*. Furthermore, weight reduction of the driven cam 132 can be achieved by forming the annular concave part 132*k* in the disc part 132*e*.

As shown in FIG. 11, the engagement concave part 132*b* has a curved bottom surface 132*c* and a circumferential surface 132*n* raised from the bottom surface 132*c*. When torque does not act on the engagement convex part 131*b* of the drive cam 131 (see FIG. 6), the engagement convex part 131b is located in the state of being pressed against the bottom surface 132c at the center of the engagement concave part 132b in the circumferential direction. When torque acts on the engagement convex part 131b, the engagement convex part 131b gets closer to the circumferential surface 132n from the center in the circumferential direction along the shape of the bottom surface 132c in accordance with the magnitude of the torque while being pressed against the bottom surface 132c. When the torque that acts on the engagement convex part 131b becomes equal to or higher than a predetermined value, the engagement convex part 131b abuts against the circumferential surface 132n. That is, the engagement convex part 131b and the circumferential surface 132n engage with each other. When the torque varies, the engagement convex part 131b reciprocates in the circumferential direction in the engagement concave part 132b. When the engagement convex part 131b moves in the circumferential direction from the center of the engagement concave part 132b, the engagement convex part 131b moves also in the axial direction (upper side in the diagram) of the clutch shaft 114 (see FIG. 5) along the shape of the bottom surface 132c of the engagement concave part 132b. Thus, the plural disc springs 134 (see FIG. 5) absorb this movement as bending while generating a reaction force.

Figure 12:
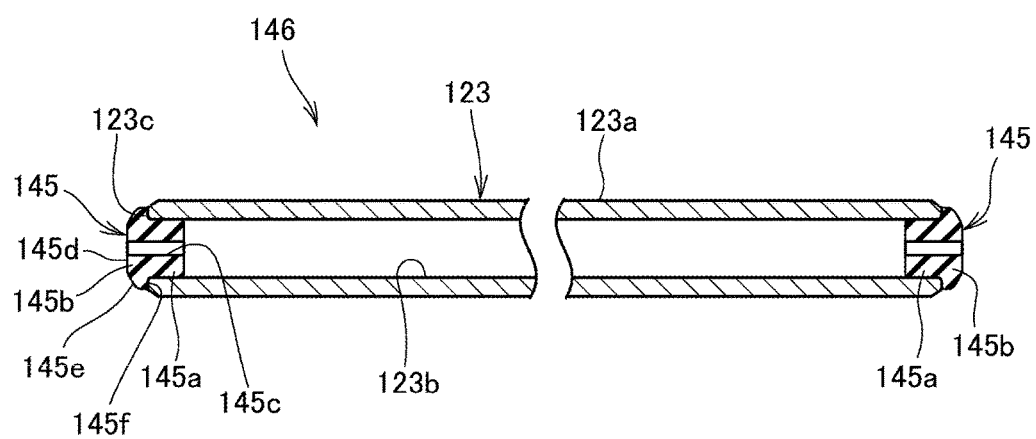
FIG. 12 is a sectional view showing a shift fork shaft assembly.

FIG. 12 is a sectional view showing a shift fork shaft assembly 146.

The shift fork shaft 123 is a part having a straight tubular shape and the shift forks 124 (see FIG. 4) are movably fitted to an outer circumferential surface 123a of the shift fork shaft 123. Caps 145 made of rubber are fitted into both end parts of the shift fork shaft 123. The above-described shift fork shaft 123 and the pair of caps 145, 145 form the shift fork shaft assembly 146.

The cap 145 is composed of a shaft part 145a that has a circular columnar shape and is press-fitted to an inner circumferential surface 123b of the shift fork shaft 123 and a head part 145b that is formed monolithically with one end part of the shaft part 145a and has a substantially trapezoidal shape as a sectional shape.

In the shaft parts 145a and the head parts 145b, through-holes 145c are opened in the axial direction to allow the inside and outside of the shift fork shaft 123 to communicate with each other when the caps 145 are fitted to the shift fork shaft 123. In the head part 145b, a taper part 145e that tapers toward a tip surface 145d of the head part 145b and an abutting surface 145f made to abut against an end surface 123c of the shift fork shaft 123 are formed.

The caps 145, 145 that are elastic members are fitted to both end parts of the shift fork shaft 123 in this manner. Due to this, when, in FIG. 4, the shift fork shaft 123 moves in the axial direction in a shaft support hole 83f formed in the shaft support part 83e of the crankcase 83 and a shaft support hole 116b formed in the shaft support part 116a of the transmission holder 116 in association with the movement of the shift forks 124, the occurrence of hit sound can be suppressed even when the cap 145 abuts against a bottom surface 83g of the shaft support hole 83f or a bottom surface 116c of the shaft support hole 116b. Furthermore, when the cap 145 abuts against the bottom surface 83g of the shaft support hole 83f or the bottom surface 116c of the shaft support hole 116b, oil that accumulates inside can be discharged from the through-hole 145c of the cap 145 on the opposite side to the cap 145 on the abutting side and the cap 145 can be smoothly bent.

As shown in the above-described FIG. 2, FIG. 4, and FIG. 5, in a vehicle transmission structure in which the power unit 16 that includes the internal combustion engine 81 and the transmission 82 and generates a driving force is provided with the clutch shaft 114 as the drive shaft that receives generation of rotational torque of the internal combustion engine 81 and rotates, the main shaft 103 as the driven shaft provided in the transmission 82 to receive the rotation of the clutch shaft 114 and be driven in an interlocked manner, and the cam-type damper 118 that is provided between the clutch shaft 114 and the main shaft 103 and is capable of absorbing relative positional deviation in the rotational direction between the clutch shaft 114 and the main shaft 103 due to rotational torque received from the clutch shaft 114, the cam-type damper 118 includes the drive cam 131 as the drive-side cam member provided on the clutch shaft 114 without capability of relative rotation and the driven cam 132 as the driven-side cam member provided on the main shaft 103 without capability of relative rotation. Furthermore, the clutch shaft 114 as one shaft of the clutch shaft 114 and the main shaft 103 contains a shaft end of the main shaft 103 as the other shaft and the main shaft 103 is rotatably supported on the inner circumferential surface of the clutch shaft 114. Moreover, the driven cam 132 as one cam member of the drive cam 131 and the driven cam 132 provided on the main shaft 103 is disposed between the front end surface 114g that is an end surface of the clutch shaft 114 and the rear end surface 103h that is a side surface of the main shaft gear 103d as an annular protrusion part provided on the main shaft 103 and the movement of the driven cam 132 in the axial direction is restricted.

According to this configuration, the movement of the driven cam 132 in the axial direction is restricted by utilizing the front end surface 114g of the clutch shaft 114. Thus, a special positioning structure is unnecessary and the structure is simplified. This can suppress size increase in the axial direction as the whole of the clutch shaft 114 on the input side and the main shaft 103 on the output side.

Furthermore, the driven cam 132 of the drive cam 131 and the driven cam 132 provided on the main shaft 103 is positioned by being pressed against the rear end surface 103h of the main shaft gear 103d with the intermediary of the drive cam 131 as the other cam member by the disc spring 134 as a biasing unit. According to this configuration, the positioning of the driven cam 132 in the axial direction is carried out by utilizing the pressing force of the disc spring 134. Thus, due to simplification of the positioning structure, size increase in the axial direction as the whole of the clutch shaft 114 on the input side and the main shaft 103 on the output side can be suppressed.

Moreover, as shown in FIG. 5, the annular protrusion part is the main shaft gear 103d provided on the main shaft 103 without capability of movement in the axial direction. Thus, by restricting the movement of the driven cam 132 in the axial direction by utilizing the main shaft gear 103d provided on the main shaft 103, a load generated in the axial direction of the driven cam 132 due to reception of high torque can be sufficiently received.

In addition, the disc spring 134 is used as the biasing unit for the drive cam 131 in the axial direction, and the disc spring 134 is disposed on the clutch shaft 114 as the one shaft or the other shaft and is positioned by being sandwiched by the drive cam 131 that abuts against this disc spring 134 and the front end surface 114t as one end surface of the annular protrusion part 114e as another annular protrusion part provided on the clutch shaft 114. Thus, by using the disc spring 134 as the biasing unit and positioning the disc spring 134 by sandwiching the disc spring 134 by the drive cam 131 and the annular protrusion part 114e provided on the clutch shaft 114, the positioning structure can be simplified in addition to the use of the disc spring 134 having a simple shape. This can suppress further size increase in the axial direction as the whole of the clutch shaft 114 and the main shaft 103.

Furthermore, in the disc spring 134, the inner circumferential edge 134a is used as an abutting part that abuts against the front end surface 114t of the annular protrusion part 114e. Thus, the radius of the part at which the disc spring 134 abuts against the annular protrusion part 114e can be set small and the outer diameter of the annular protrusion part 114e can be set small, which can suppress weight increase.

Moreover, the rear end surface 114u of the annular protrusion part 114e as the other end surface abuts against a side surface of the bearing 113 as a bearing member that rotatably supports the clutch shaft 114, and the annular protrusion part 114e is used as a thrust restricting part that restricts the movement of the clutch shaft 114 in the axial direction. Thus, positioning of the disc spring 134 and restriction of the movement of the clutch shaft 114 in the axial direction can be carried out by the annular protrusion part 114e and increase in the shaft length as the whole of the clutch shaft 114 and the main shaft 103 can be suppressed.

In addition, plural disc springs are overlapped with each other as the disc springs 134 and the disc springs 134 are so disposed that the abutting part of the disc spring 134 that abuts against the drive cam 131 is the outer circumferential edge 134b. Thus, a wide range can be ensured as the range of the load that acts on the drive cam 131 and the pressing force of the drive cam 131 against transmitted torque can be sufficiently ensured. Furthermore, the drive cam 131 can be stably pressed by the disc springs 134.

Furthermore, in the clutch shaft 114 and the main shaft 103, the oil holes 114m and 103f as oil lubrication holes that penetrate between the inside and outside of the shaft are made in the range in which the drive cam 131 is slid in the axial direction. Thus, oil can be supplied from the inside of the clutch shaft 114 and the main shaft 103 to the range of the slide of the drive cam 131 in the axial direction through the oil holes 114m and 103f, so that the lubrication performance can be ensured.

Moreover, in both of the clutch shaft 114 and the main shaft 103, the oil holes 114m and 103f that penetrate between the inside and outside of the clutch shaft 114 and the main shaft 103 are disposed to be located at the same position in the axial direction and communicate with each other in the range in which the clutch shaft 114 contains the main shaft 103. Thus, the oil inside the shafts can be supplied also to the slide site between the clutch shaft 114 and the main shaft 103 in addition to the drive cam 131. This can ensure the lubrication performance for the slide site of the drive cam 131 and the shaft slide site between the clutch shaft 114 and the main shaft 103.

The above-described embodiment merely shows one aspect of the present invention and modifications and applications can be arbitrarily made without departing from the gist of the present invention.

For example, in the above-described embodiment, the plural engagement convex parts 131b of the disc part 131d shown in FIG. 6 and the plural engagement parts 132f of the disc part 132e shown in FIG. 9 are both provided at every 180° in the circumferential direction. However, the configuration is not limited thereto and they may be provided at every 120°, 90°, 60°, 45°, or another angle.

The present invention is not limited to the case of application to the power unit 16 of the motorcycle 10 and can be applied also to vehicles other than the motorcycle 10 and power units of industrial machines.

DESCRIPTION OF REFERENCE SYMBOLS

16: Power unit
81: Internal combustion engine
82: Transmission
103: Main shaft (driven shaft)
103d: Main shaft gear (annular protrusion part, gear)
103f, 103g: Oil hole
103h: Rear end surface (end surface)
113: Bearing (bearing member)
114: Clutch shaft (drive shaft)
114e: Annular protrusion part (another annular protrusion part)
114g: Front end surface (end surface)
114m: Oil hole
114t: Front end surface (one end surface)
114u: Rear end surface (the other end surface)
118: Cam-type damper
131: Drive cam (drive-side cam member)
132: Driven cam (driven-side cam member)
134: Disc spring
134a: Inner circumferential edge

The invention claimed is:

1. A vehicle transmission structure in which a power unit that includes an internal combustion engine and a transmission and generates a driving force is provided with:
   a drive shaft that receives generation of rotational torque of the internal combustion engine and rotates;
   a driven shaft provided in the transmission to receive rotation of the drive shaft and be driven in an interlocked manner; and
   a cam-type damper that is provided between the drive shaft and the driven shaft and is capable of absorbing relative positional deviation in a rotational direction between the drive shaft and the driven shaft due to rotational torque received from the drive shaft,
   wherein
   the cam-type damper includes:
      a drive-side cam member provided on the drive shaft without capability of relative rotation; and
      a driven-side cam member provided on the driven shaft without capability of relative rotation,
   one shaft of the drive shaft and the driven shaft contains a shaft end of the other shaft and the other shaft is rotatably supported on an inner circumferential surface of the one shaft,
   one cam member of the drive-side cam member and the driven-side cam member provided on the other shaft is disposed between an end surface of the one shaft and a side surface of an annular protrusion part provided on the other shaft and movement of the one cam member in an axial direction is restricted, and
   in the drive shaft and the driven shaft, oil lubrication holes that penetrate between inside and outside of the shaft are made in a range in which the other cam member is slid in the axial direction.

2. The vehicle transmission structure according to claim 1, wherein
   the one cam member is positioned by being pressed against an end surface of the annular protrusion part by a biasing unit through the other cam member of the drive-side cam member and the driven-side cam member.

3. The vehicle transmission structure according to claim 2, wherein
a disc spring is used as a biasing unit for the other cam member in the axial direction, and the disc spring is disposed on the one shaft of the other shaft and is positioned by being sandwiched by the other cam member that abuts against the disc spring and one end surface of another annular protrusion part provided on the one shaft.

4. The vehicle transmission structure according to claim 3, wherein
in the disc spring, an inner circumferential edge is used as an abutting part that abuts against one end surface of the other annular protrusion part.

5. The vehicle transmission structure according to claim 3, wherein
the other end surface of the other annular protrusion part abuts against a side surface of a bearing member that rotatably supports the one shaft, and the other annular protrusion part is used as a thrust restricting part that restricts movement of the one shaft in the axial direction.

6. The vehicle transmission structure according to claim 2, wherein
plural disc springs are overlapped with each other as the biasing unit, and
the disc springs are so disposed that an abutting part of the disc spring that abuts against the other cam member is an outer circumferential edge.

7. The vehicle transmission structure according to claim 2, wherein
the annular protrusion part is a gear provided on the other shaft without capability of movement in the axial direction.

8. The vehicle transmission structure according to claim 1, wherein
the annular protrusion part is a gear provided on the other shaft without capability of movement in the axial direction.

9. The vehicle transmission structure according to claim 8, wherein
a disc spring is used as a biasing unit for the other cam member of the drive-side cam member and the driven-side cam member in the axial direction, and the disc spring is disposed on the one shaft or the other shaft and is positioned by being sandwiched by the other cam member that abuts against the disc spring and one end surface of another annular protrusion part provided on the one shaft.

10. The vehicle transmission structure according to claim 9, wherein
in the disc spring, an inner circumferential edge is used as an abutting part that abuts against one end surface of the other annular protrusion part.

11. The vehicle transmission structure according to claim 10, wherein
the other end surface of the other annular protrusion part abuts against a side surface of a bearing member that rotatably supports the one shaft, and the other annular protrusion part is used as a thrust restricting part that restricts movement of the one shaft in the axial direction.

12. The vehicle transmission structure according to claim 9, wherein
the other end surface of the other annular protrusion part abuts against a side surface of a bearing member that rotatably supports the one shaft, and the other annular protrusion part is used as a thrust restricting part that restricts movement of the one shaft in the axial direction.

13. The vehicle transmission structure according to claim 1, wherein
the oil lubrication holes are disposed to be located at the same position in the axial direction and communicate with each other in a range in which the one shaft contains the other shaft.

* * * * *